US006945441B2

(12) United States Patent
Gates et al.

(10) Patent No.: US 6,945,441 B2
(45) Date of Patent: Sep. 20, 2005

(54) ATV MOUNTING DEVICE

(75) Inventors: George D. Gates, 2286 Bonanza Cir., So. Jordan, UT (US) 84095; Travis D. Gates, Riverton, UT (US)

(73) Assignee: George D. Gates, West Jordan, UT (US)

( * ) Notice: Subject to any disclaimer, the term of this patent is extended or adjusted under 35 U.S.C. 154(b) by 147 days.

(21) Appl. No.: 10/318,338

(22) Filed: Dec. 9, 2002

(65) Prior Publication Data

US 2003/0146364 A1 Aug. 7, 2003

Related U.S. Application Data

(60) Provisional application No. 60/353,326, filed on Feb. 1, 2002.

(51) Int. Cl.[7] ............................ B60R 9/08; B60R 11/00

(52) U.S. Cl. ....................... 224/401; 224/420; 224/448; 224/452; 224/454; 224/457; 224/908; 224/909; 224/913

(58) Field of Search ................................ 224/401, 420, 224/424, 425, 426, 448, 451, 452, 454, 457, 558, 908, 909, 913; 280/288.4, 769; 354/81

(56) References Cited

U.S. PATENT DOCUMENTS 1,312,947 A 8/1919 Billington
1,735,212 A 11/1929 Pawsat
2,705,603 A 4/1955 Bitz et al.
4,607,772 A * 8/1986 Hancock ..................... 224/420
4,711,422 A 12/1987 Ibanez
4,827,654 A * 5/1989 Roberts ...................... 248/514
4,842,174 A 6/1989 Sheppard et al.
5,431,364 A 7/1995 Etter
5,497,214 A 3/1996 Labree
D370,193 S 5/1996 Shull
5,551,660 A 9/1996 Leduchowski
5,664,750 A 9/1997 Cohen
5,697,181 A * 12/1997 Savant ....................... 224/420
5,706,990 A * 1/1998 Lahrson ...................... 224/558
5,816,462 A * 10/1998 Brantley ..................... 224/401
5,876,005 A * 3/1999 Vasconi ................... 248/276.1
5,878,929 A * 3/1999 Leonard ..................... 224/401
D411,207 S 6/1999 Richter
D419,415 S 1/2000 Richter
6,123,306 A 9/2000 Jackson
6,293,449 B1 9/2001 McGuire et al.
6,382,488 B1 * 5/2002 Hancock ..................... 224/547
6,626,339 B2 * 9/2003 Gates et al. ................ 224/401
6,634,530 B1 * 10/2003 Black ......................... 224/401

* cited by examiner

*Primary Examiner*—Gary E. Elkins
(74) *Attorney, Agent, or Firm*—Thorpe North & Western LLP

(57) ABSTRACT

A mounting device for use with ATVs that can be semi-permanently attached to an ATV to allow an operator to attach and detach auxiliary items to the device, and correspondingly, to the ATV. The device includes a receiving socket to temporarily receive an adapter, the receiving socket including a maintaining means for maintaining the adapter in the socket and allow the user to quickly secure and release the adapter, and a mounting assembly, coupled to the upper receiving socket and configured to be attached to the ATV. Using a plurality of adapters, each having an auxiliary item attached, provides a mounting system for quickly interchanging auxiliary items and securing them to the ATV with minimum effort.

21 Claims, 5 Drawing Sheets

ATV MOUNTING DEVICE

PRIORITY

This application claims the benefit of U.S. Provisional Application No. 60/353,326 filed Feb. 1, 2002 and U.S. Des. Pat. No. D466,856 filed Feb. 1, 2002.

BACKGROUND OF THE INVENTION

1. Field of the Invention

The present invention relates generally to a mounting device and system for use on all terrain vehicles.

2. Related Art

All terrain vehicles ("ATVs") are used for a wide range of activities, including recreation, hunting, working and transportation. Many of these activities involve the use of auxiliary items, such as cameras, spotting scopes, umbrellas and warning flags. Because operation of the ATV generally requires the use of both hands of an operator, auxiliary items must be stored either on the ATV, or on the person of the operator and retrieved when desired. This is problematic for auxiliary items that an operator would like to be able to access very quickly, such as a spotting scope or a camera. Such items cannot be retrieved quickly because retrieval often requires the operator to dismount from the ATV to retrieve the item from its storage location.

An operator of an ATV who wishes to carry auxiliary items generally has a choice of storage options. The operator can store an item on the ATV, store the item on the person of the operator, or mount the item to the ATV. ATVs can be equipped with storage racks and bags for storing such items. Storage racks work well for larger items that can be secured to the storage rack with ropes or "bungee" chords, but do not work well for smaller items, which could fall through the racks while the ATV is in operation. Also, elongate items that are generally used in a vertical orientation, such as camera or scope mounts, can only be stored in the storage rack by laying the item horizontally on the rack. To be used, the items must be removed from the rack and elevated into a vertical position. Storing items in storage bags or on the person of the operator, such as in a backpack, is problematic in that an operator must open the bag or pack and remove the item before use.

An operator can also mount an auxiliary item directly to the ATV. For instance, warning flags, which often must be used in sand dune or hilly areas, are often mounted to the ATV. However, mounting such items is generally time consuming and often requires the use of one or more tools. Also, the items are generally removed from the ATV when no longer required, a step that again requires tools and consumes more time.

SUMMARY OF THE INVENTION

It has been recognized that it would be advantageous to develop a mounting device for use with ATVs that can be semi-permanently attached to an ATV, and thereafter allows an operator to quickly attach and detach auxiliary items to the device, and correspondingly, to the ATV.

The present invention provides an ATV quick-release mounting device with a mounting assembly which is attached to a member of the ATV. The mounting assembly is coupled to a receiving socket, to receive an adapter which may hold an auxiliary item. The receiving socket includes a maintaining means for maintaining of the adapter and to allow a user to quickly secure and release the adapter. The present invention can be semi-permanently attached to the ATV by the mounting assembly, and used thereafter to quickly and easily attach and remove auxiliary items to and from the ATV. Various auxiliary items may be secured such as firearms, spotting scopes, binoculars, monoculars, cameras, tools, and other view magnification devices.

In accordance with another aspect of the present invention, a mounting system for removably mounting auxiliary items includes an attachment assembly for attaching to a member of the ATV, and a receiving assembly with a socket. As part of the system, a plurality of adapters may be selectively and removably connected to the socket and to the auxiliary items. When needed an adapter having a particular auxiliary item attached thereto may be inserted into the socket and later removed in exchange for another adapter having an auxiliary item attached. The socket includes a maintaining means for quick-release maintaining of the adapter in the socket.

In accordance with a more detailed aspect of the present invention, the device includes a vertical riser to couple the receiving socket to the mounting assembly. The vertical riser can be threadably coupled or press-fit to the receiving socket and mounting assembly. The vertical riser can alternately be constructed as an integral piece that includes a mounting assembly component. The vertical riser can also be constructed as two or more pieces that telescopically extend and retract to adjust the height of the vertical riser.

In accordance with another, more detailed aspect of the present invention, the maintaining means can be configured as a bolt threaded through the wall of the receiving socket and configured to tighten against the adapter to secure the adapter to the mounting device. The maintaining means can also be configured as a tapered interior wall of the receiving socket to frictionally engage the adapter upon insertion into the receiving socket. The maintaining means can also be a pin extending through aligned openings in the receiving socket wall and the adapter. The pin can be a spring-ball type of pin or a threaded pin. The maintaining means can also be configured as a biasing element contained within the adapter and coupled to an engaging ball configured to engage openings in the sides of the adapter and the receiving socket. The maintaining means can also be more permanent in nature and can be configured as an adhesive, to bond the adapter to the receiving socket, a weld, or a press-fit.

In another more detailed aspect of the present invention, a mounting device is used to mount items to an all-terrain vehicle. The mounting device includes a mounting assembly connected to a member of the all-terrain vehicle and one end of a telescoping shank connected to the mounting assembly such that the length of the shank may be adjusted. At an opposite end of the shank is connected an attachment surface configured for securing an item thereon.

In yet another more detailed aspect of the present invention, the mounting device is designed for mounting hunting implements to an all-terrain vehicle. The hunting implement mounting device includes a mounting assembly having an attachment surface connected thereto which is capable of holding at least one hunting implement. A maintaining means is provided for maintaining the hunting implement on the all-terrain vehicle in a quick-release manner. Additionally, at least two hunting implements are provided which are interchangeable and releasably secured to the attachment surface.

In another detailed aspect of the present invention, the maintaining means may be located to provide quick-release of the attachment surface from the mounting assembly. In still another aspect of the present invention, the maintaining means may optionally, or in addition to the prior location, be located to provide quick-release of the mounting device from the all-terrain vehicle.

Finally, in another detailed aspect of the present invention, the mounting assembly and the attachment surface are substantially collinear to produce a substantially vertical mounting device which minimizes obstruction of neighboring areas.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION

Figure 1:
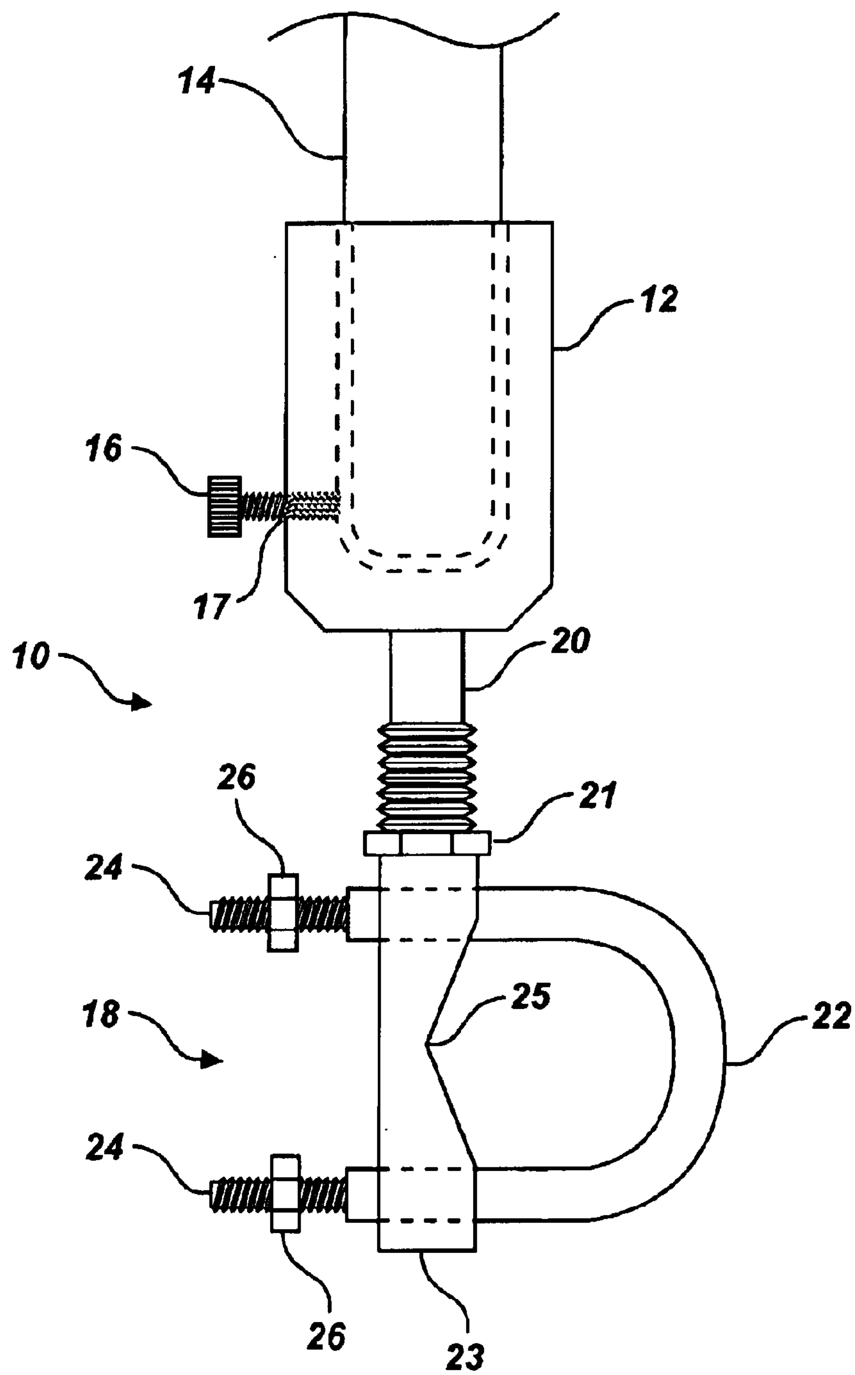
FIG. 1 is a side plan view of an ATV quick release mounting device in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1, a device, indicated generally at 10, in accordance with the present invention is shown for an ATV mounting device. In accordance with one aspect of the present invention, the device 10 includes a receiving socket 12 configured to receive an adapter 14. The receiving socket can include maintaining means, associated with the socket, for maintaining the adapter in the socket. In addition, the maintaining means can quickly secure the adapter to the receiving socket and subsequently quickly release the adapter for easy removal. Although the maintaining means is shown as a textured screw 16, other configurations, such as wing-screws, thumb-screws, spring-ball interlock, or other quick-release mechanisms may be used. The maintaining means can also be configured as an adhesive, weld or press-fit securing devices to more permanently couple the adapter to the receiving socket. The device also includes a mounting assembly 18 configured to couple the mounting device to the ATV. The device can also include a vertical riser 20 to couple the receiving socket 12 to the mounting assembly 18.

Figure 2A:
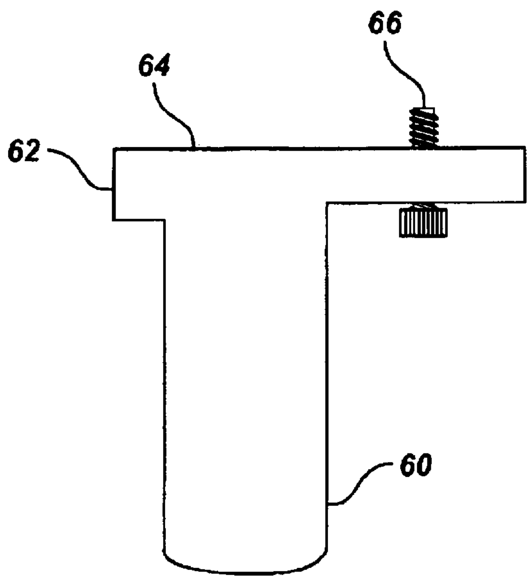
FIG. 2*a* is a side plan view of an adapter of the present invention having a platform.
Figure 2B:
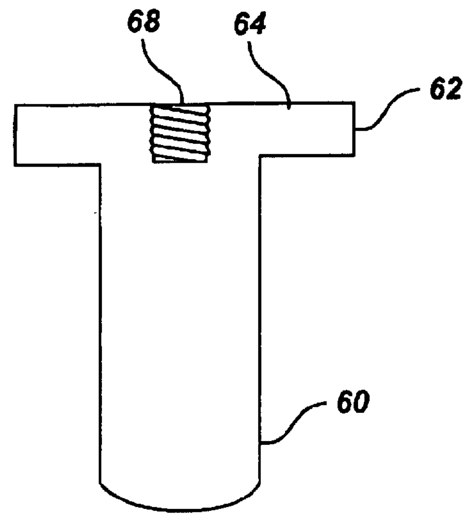
FIG. 2*b* is a side plan view of an alternative adapter of the present invention having a platform.
Figure 2C:
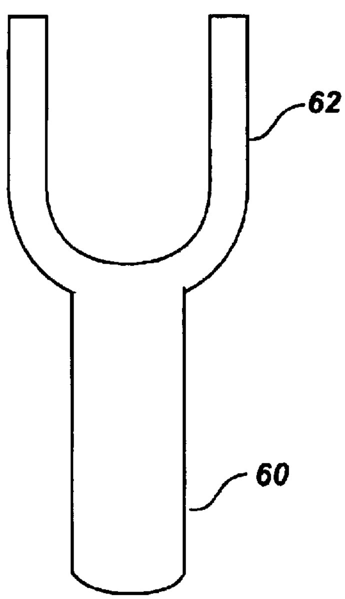
FIG. 2*c* is a side plan view of another alternative adapter of the present invention having a U-shaped holding member.

The adapter 14 may take a variety of configurations some of which are shown in FIGS. 2*a* through 2*c*. As shown in FIG. 2*a*, the receivable end 60 of the adapter is designed to be removably disposable in the socket. The holding end 62 of the adapter 14 is designed based on the type of auxiliary item the user desires to mount to the ATV. FIG. 2*a* shows an adapter having a platform surface 64 and a mounting screw 66 for removably attaching an auxiliary item, such as a camera or view magnification device having an appropriate threaded inset in which to thread the mounting screw. FIG. 2*b* shows an adapter having a platform surface 64 and a threaded inset 68 for removably attaching an auxiliary item having a threaded member. FIG. 2*c* shows an adapter having a holding end 62 having a generally U-shaped member for holding auxiliary items such as tools, firearms, bows, etc. Of course, some auxiliary items will require more than one mounting assembly to securely hold the auxiliary item. The holding end of the adapter may be of any configuration capable of holding an auxiliary item to the adapter and may include, without limitation, hook-and-loop type, clamps, straps, or combinations of these. Other possible configurations will occur to those using the present invention and desiring to secure various items to an ATV. Typically, the auxiliary items are mounted to an appropriate adapter and the items mounted as necessary.

Once mounted to the ATV, an operator of the ATV can use the device 10 to quickly secure or release an auxiliary item to the ATV. For example, the operator can use the device to quickly mount a camera support to the ATV to support a camera for use on the ATV. Once the camera support is mounted to the device, both of the operator's hands are free to operate the ATV, and the operator still has quick access to the camera. If the operator desires to photograph a subject, he or she could simply stop the ATV and quickly use the camera, without having to retrieve the camera from storage. The adapter could also be used to hold any of a number of auxiliary items commonly used by operators of ATVs, including a spotting scope mount, a gun rest, a warning flag, an umbrella, or a rack for holding other items. After being used for one purpose, the operator can disengage the quick-release mechanism of the current item being held and removably mount another item in very little time by engaging the maintaining means to hold the second adapter-auxiliary item combination. The quick-release mounting device of the present invention could also be used with any number of recreational vehicles, including ATVs, snowmobiles, motorcycles, bicycles, boats, jet skis, and tree-stands. The present discussion focuses on the use of the invention with an ATV as an exemplary embodiment, and it is to be understood that the invention is not thereby limited.

Referring again to FIG. 1, the receiving socket 12 can be of any configuration but is preferably generally cylindrical in shape to receive a generally cylindrical receivable end 60 of an adapter 14. A square or rectangular shaped receivable end or socket could also be used. The receiving socket is generally a hollow elongate socket having a closed end and an open end. Further, the closed end is attached to the mounting assembly via a connector, such as a riser assembly 20, discussed in more detail below.

The mounting assembly can be of any configuration known to those skilled in the art. The embodiment illustrated in FIG. 1 includes a generally U-shaped bolt 22 which passes through a pair of openings or parallel holes in a rod member retaining bracket 23. The retaining bracket includes a notch 25 which can rest on a member of the ATV (not shown). The ends 24 of the U-shaped bolt are threaded to accept retaining members 26 such as nuts which can be tightened to securely force the U-shaped bolt and notch against opposing sides of the member of the ATV to mount the quick release device to the ATV. The mounting assembly may be mounted at various positions on the ATV such as the handlebars, cargo racks or the ATV frame. Once the relatively time-consuming step of mounting the device to the ATV is complete, auxiliary items can be quickly and easily secured and removed from the ATV using the above-described adapters.

Figure 3A:
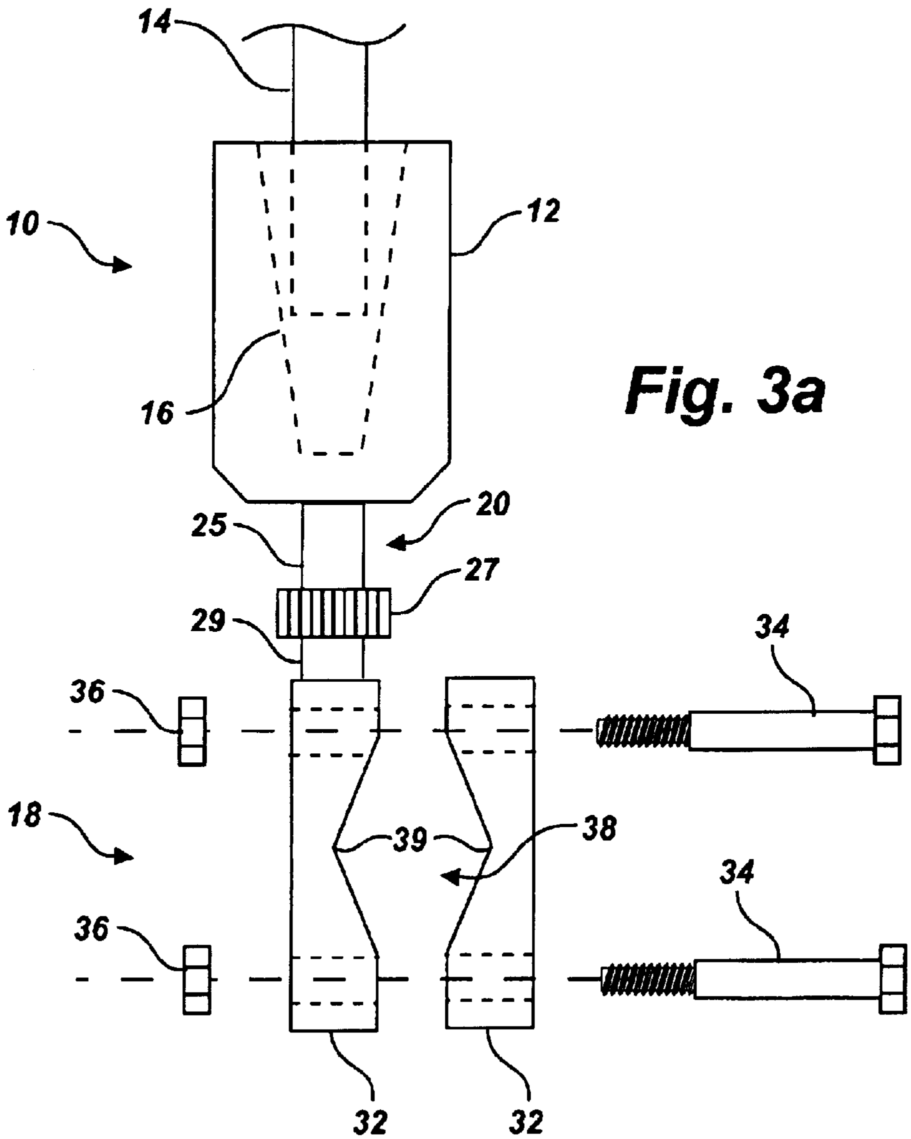
FIG. 3*a* is a side plan view of an alternate embodiment of the present invention.

The mounting assembly 18 is not limited to the embodiment illustrated in FIG. 1, but can also be configured in any manner known to those skilled in the art. Illustrated in FIG. 3*a* is an alternate mounting assembly configuration. The vertical riser 20 can be coupled to one of a pair of chucks 32. The chucks can include notches 39 which are configured to accept a member of the ATV at 38 to secure the quick release device to the ATV. Once positioned around the portion of the ATV, threaded bolts 34 are inserted through openings in the chucks. Nuts 36 can threadably engage the bolts and force the chucks into contact with the member of the ATV. The notch can be as shown, or can include serrated teeth to improve the frictional contact with the portion of the ATV or may be a concave indentation.

Figure 3B:
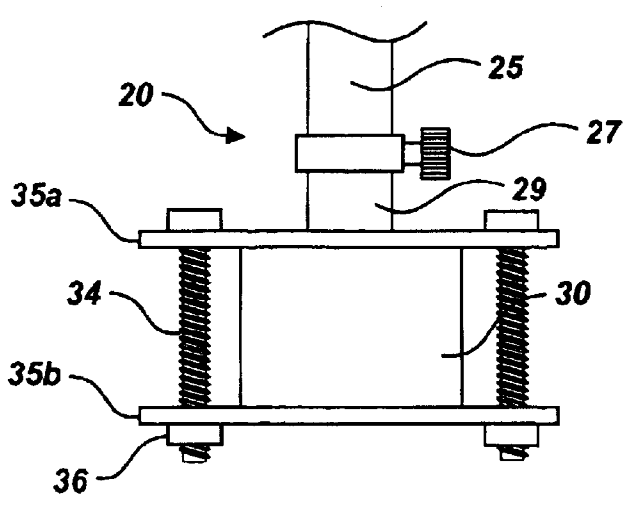
FIG. 3*b* is a side plan, partial cutaway view of an alternate embodiment of the mounting assembly of the present invention.

FIG. 3*b* illustrates yet another alternative mounting assembly suitable for use in the present invention. This embodiment is particularly suited to ATV members having a rectangular cross-section. Two parallel plates 35*a* and 35*b* are placed on opposing sides of an ATV member 30 having a rectangular cross-section. Plate 35*a* has the vertical riser 20 portion of the invention attached thereon. This vertical riser section may be a single solid piece or may be configured for variable adjustment of length as shown in FIG. 3*b*. The plates are secured to the ATV member 30 using at least two transverse bolts 34 secured by nuts 36. Although the mounting assemblies shown in FIGS. 1, 3*a* and 3*b* are semi-permanent attachments other configurations are also considered within the scope of the present invention which are quick-release such as spring clamps, latched clamps or other known securing mounts.

As shown in FIG. 1, the vertical riser 20 can be threaded to accept a nut 21. The retaining bracket 23 can also be threaded to enable the vertical riser to threadably engage the retaining bracket. Once positioned in a desirable location, the nut can be tightened against the retaining bracket to control relative movement of the vertical riser and retaining bracket. Alternatively, the vertical riser can be press-fit into the retaining bracket, or coupled thereto in any manner known to those skilled it the art. The vertical riser and retaining bracket can alternately be formed of an integral piece. In this manner, the vertical riser can include openings for insertion of the ends 24 of the U-shaped bolt 22. The vertical riser can similarly engage the receiving socket 12 in a variety of configurations, including a threaded connection, a press fit, or other known configuration. The vertical riser can also be formed of two or more pieces and thereby allow the operator to adjust the length of the vertical riser. As illustrated in FIG. 3*b*, the vertical riser can include a locking mechanism 27 which can lock the relative positions of the upper 25 and lower 29 portions of the vertical riser. In this manner, the operator can release the locking mechanism and adjust the length of the vertical riser, thereby adjusting the height of the adapter 14. Once a desirable length is obtained, the locking mechanism 27 can be engaged to fix the length of the vertical riser.

The maintaining means is shown in FIG. 1 as a threaded fastener 16 extending through the receiving socket 12. In this manner, once the adapter 14 is inserted into the receiving socket 12, the maintaining means can be tightened against the adapter to secure the adapter to the receiving socket. It will be appreciated that the maintaining means can be quickly engaged and disengaged to allow for quick interchange of auxiliary items.

The maintaining means for quick-release maintenance of the adapter is not limited to a threaded configuration. As illustrated by FIG. 3*a*, the maintaining means 16 can be a tapered inside wall of the receiving socket configuration. In this embodiment, the adapter is simply inserted into the receiving socket until it engages the narrowing inside walls of the receiving socket. The adapter is held fast by the frictional contact between the adapter and the inside wall of the receiving socket. The auxiliary item can then be quickly removed and replaced, if desired, with another auxiliary item-adapter assembly. Although often preferred, the maintaining means is not limited to a quick connect configuration. The maintaining means can also be more permanent in nature, such as adhesive, weld or press-fit means.

Figure 4A:
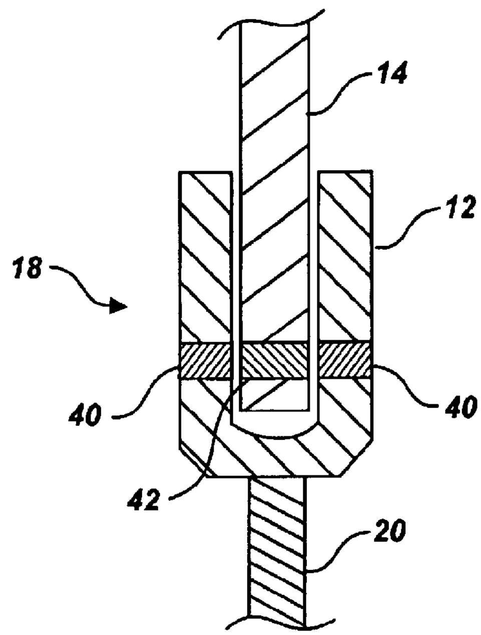
FIG. 4*a* is a side plan, partial cutaway view of an alternate embodiment of the receiving assembly of the present invention.
Figure 4A:
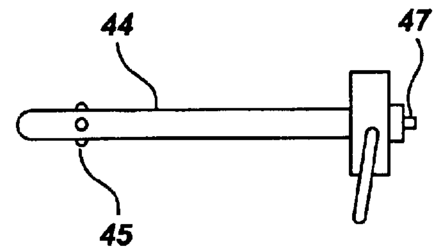
Figure 4B:
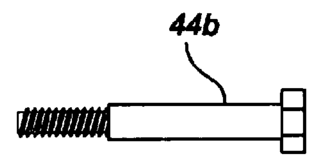
FIG. 4*b* is a side plan view of one feature of an embodiment of the present invention.
Figure 4C:
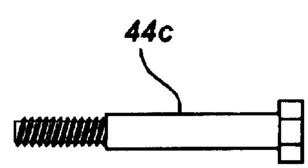
FIG. 4*c* is a side plan view of one feature of an embodiment of the present invention.

An alternate embodiment of the maintaining means is illustrated in FIGS. 4*a* through 4*c*. The receiving socket 12 can include openings 40 which correspond to an opening 42 in the adapter 14. Once the adapter is inserted into the receiving socket 12, the openings 40 and 42 can be aligned and a pin 44 can be inserted through all three openings to secure the adapter to the receiving socket. The pin 44 shown in FIG. 4*a* can be a conventional spring-ball loaded pin. When installed, the balls 45 are held outwardly by a biasing element inside the pin. When the release 47 is activated, the balls retract below the external surface of the pin and allow the pin to be withdrawn through the openings. FIGS. 4*a* and 4*b* illustrate alternate embodiments of the pin. The pin can be a threaded bolt 44*b* which can threadably engage one of the openings 40 in the receiving socket to thereby secure the adapter. Alternately, the threaded bolt can pass through all openings 40 and 42 and be secured with a nut. As shown in FIG. 4*c*, the pin could also be a simple rod 44*c* which, once inserted into the openings, is held securely in place by the weight of the adapter 14 and auxiliary item. Also, a cotter pin could be inserted through the openings to secure the adapter to the receiving socket. The bolts and pins described above are further examples of maintaining means for quickly maintaining and securing the adapter to the receiving socket.

Figure 5:
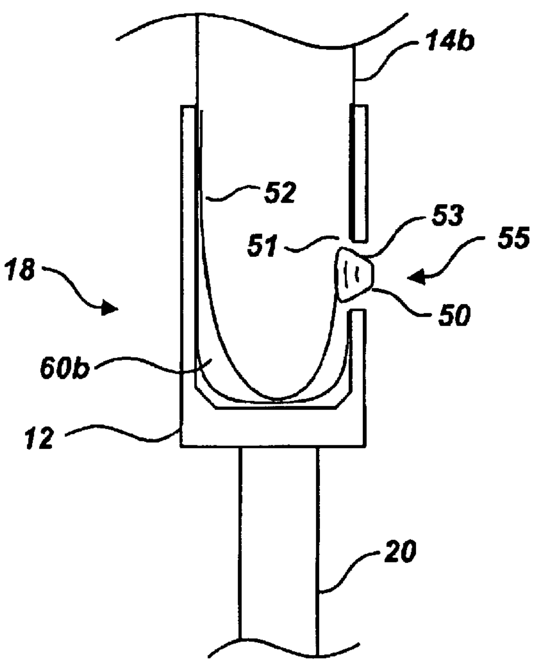
FIG. 5 is a side plan cutaway view of an alternate embodiment of the receiving assembly of the present invention.

Another embodiment of the maintaining means is illustrated in FIG. 5. In this embodiment, the maintaining means includes an engagement button or detent 50 which protrudes through an opening 51 in the wall of the receivable end 60*b* of an adapter 14*b*. The engagement button is biased against the wall of the adapter by a biasing element 52 within the receiving end 60*b* of the adapter. Because the engagement button is larger than the opening 51, only a portion of the button protrudes from the external wall of the adapter. As the adapter is inserted into the receiving socket 12, the operator can depress the engagement button by applying a force at 55.

When the adapter is fully inserted into the receiving socket, the biasing member forces the engagement button into opening 53 in the wall of the receiving socket. The adapter is held securely in place by the engagement button. This embodiment of the maintaining means could be utilized with any adapter equipped with the biasing element and engagement button.

Figure 6:
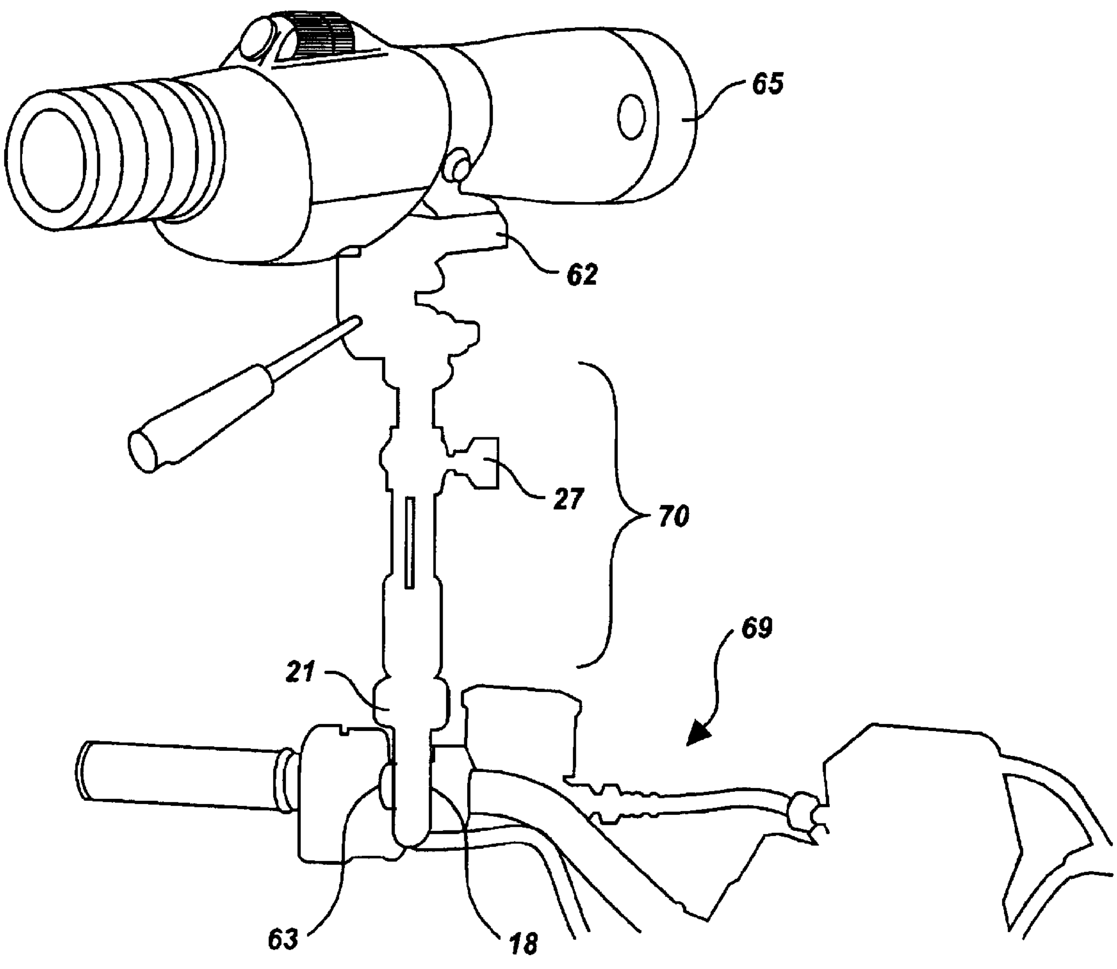
FIG. 6 is a perspective view of an alternative embodiment of the mounting device of the present invention.

FIG. 6 illustrates yet another embodiment of the present invention wherein a mounting device is used to mount items to an ATV 69. The mounting device includes a mounting assembly 18 connected to a member 63 of the all-terrain vehicle 69. A telescoping shank 70 is connected to the mounting assembly 18 at one end. A rapid detaching member such as a locking nut 21 may be provided to releasably secure the shank to the mounting assembly. The length of the shank may be adjusted using locking mechanism 27. The opposite end of the shank is connected an attachment surface 62 configured for securing an item 65 thereon. A monocular is shown in FIG. 6 although any number of items could be secured to the attachment surface such as, but not limited to, firearms, spotting scopes, binoculars, cameras, tools, view magnification devices, hunting implements and the like. The mounting surface 62 may include a secondary surface which may be easily detachable from the mounting surface to increase the ease with which various items may be interchanged on the mounting device.

In yet another more detailed aspect of the present invention, the mounting device is designed for mounting hunting implements to an all-terrain vehicle. The hunting implement mounting device includes a mounting assembly having an attachment surface connected thereto which is capable of holding at least one hunting implement. A maintaining means is provided for maintaining the hunting implement on the all-terrain vehicle in a quick-release manner as discussed above. Additionally, at least two hunting implements are provided which are interchangeable and releasably secured to the attachment surface.

Various hunting implements may be secured to the ATV using the device of the present invention including, but not limited to, firearms, bows, spotting scopes, binoculars, fishing rods, nets, and cameras. Additionally, various holding members may be secured to the attachment surface 62 which hold the hunting implement such as a rifle rest having a base.

In another detailed aspect of the present invention, the maintaining means may be located to provide quick-release of the attachment surface from the mounting assembly in the same manner as discussed above. In still another aspect of the present invention, the maintaining means may optionally, or in addition to the prior location, be located to provide quick-release of the mounting device from the ATV such as with a spring clamp or latching clamp.

Finally, in another detailed aspect of the present invention, the mounting assembly 18 and the attachment surfaces 62 are substantially collinear to produce a substantially vertical mounting device which minimizes obstruction of neighboring areas. This configuration is advantageous in several respects. For example, when the mounting device is secured to either the front or rear cargo racks of the ATV the vertical orientation will reduce interference with full use of the cargo area for other items. Additionally, the vertical orientation of the present invention will improve driving visibility when secured to the front of the ATV.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments of the invention, it will be apparent to those of ordinary skill in the art that numerous modifications can be made without departing from the principles and concepts of the invention as set forth herein.

What we claim is:

1. A quick-release mounting device configured to mount items to an all-terrain vehicle, the device comprising:

a) an all-terrain vehicle;

b) a mounting assembly connected to a member of the all-terrain vehicle; and c) a receiving socket, connected to the mounting assembly using a vertical riser having an adjustable length, configured to receive an adapter; and d) a maintaining means for maintaining of the adapter in the receiving socket.

2. A quick-release mounting device in accordance with claim 1, wherein the adapter holds an auxiliary item selected from the group consisting of: a firearm, a spotting scope, a binocular, a monocular, a camera, a tool, and a view magnification device.

3. A quick-release mounting device in accordance with claim 2, wherein the auxiliary item is a spotting scope.

4. A quick-release mounting device in accordance with claim 2, wherein the auxiliary item is a camera.

5. A quick-release mounting device in accordance with claim 1, wherein the maintaining means is selected from the group consisting of a screw, a thumb screw, a wing screw, a pin, and a press-fit.

6. A mounting system configured to removably mount an auxiliary item to an all-terrain vehicle, the system comprising:

a) a mounting device having an attachment assembly configured to attach to the all-terrain vehicle and having a receiving assembly with a socket attached to the mounting device using a vertical riser having an adjustable length;

b) a plurality of adapters, selectively and removably coupled to the mounting device, each having a holding end configured to hold the auxiliary item and a receivable end opposite the holding end, the receiving end being removably disposable in the socket; and c) a maintaining means, associated with the socket, for maintaining of the receivable end in the socket.

7. A mounting system in accordance with claim 6, wherein the auxiliary item is selected from the group consisting of: a firearm, a spotting scope, a binocular, a monocular, a camera, a tool, and a view magnification device.

8. A mounting system in accordance with claim 7, wherein the auxiliary item is a spotting scope.

9. A mounting system in accordance with claim 7, wherein the auxiliary item is a camera.

10. A mounting system in accordance with claim 6, wherein the maintaining means is selected from the group consisting of screws, thumb screws, wing screws, pins, and press-fitting.

11. A method for mounting an auxiliary item to an all-terrain vehicle, comprising the steps of:

a) attaching a mounting assembly of a mounting device to the all-terrain vehicle, the mounting device having a socket attached to the mounting assembly using a vertical riser having an adjustable length;

b) coupling a receiving end of an adapter to the socket of the mounting device, the adapter including a holding end configured to hold the auxiliary item; and c) removably attaching the auxiliary item to the holding end of the adapter.

12. The method of claim 11, comprising the further step of adjusting a vertical height of the socket relative to the ATV by adjusting a vertical height of the vertical riser.

13. The method of claim 11, wherein the auxiliary item is selected from the group consisting of a firearm, a spotting scope, a binocular, a monocular, a camera, a tool, and a view magnification device.

14. The method of claim 12, wherein the auxiliary item is a spotting scope.

15. The method of claim 12, wherein the auxiliary item is a camera.

16. The method of claim 11, wherein the step of coupling a receiving end of the adapter to the socket includes the step of coupling using one of: a screw, a thumb screw, a wing screw, a pin, a press-fit, and an adhesive.

17. A mounting device configured to mount items to an all-terrain vehicle, the device comprising:

a) a mounting assembly connected to a member of the all-terrain vehicle;

b) a receiving socket, connected to the mounting assembly using a vertical riser having an adjustable length, configured to receive an adapter; and c) a maintaining means for maintaining of the adapter in the receiving socket.

18. A quick-release mounting device in accordance with claim 17, wherein the adapter holds an auxiliary item selected from the group consisting of: a firearm, a spotting scope, a binocular, a monocular, a camera, a tool, and a view magnification device.

19. A quick-release mounting device in accordance with claim 18, wherein the auxiliary item is a spotting scope.

20. A quick-release mounting device in accordance with claim 18, wherein the auxiliary item is a camera.

21. A quick-release mounting device in accordance with claim 17, wherein the maintaining means is selected from the group consisting of a screw, a thumb screw, a wing screw, a pin, and a press-fit.

* * * * *